(12) United States Patent
Divan et al.

(10) Patent No.: US 8,953,349 B2
(45) Date of Patent: Feb. 10, 2015

(54) SYSTEMS AND METHODS FOR PROVIDING AC/DC BOOST CONVERTERS FOR ENERGY HARVESTING

(75) Inventors: Deepakraj M. Divan, Marietta, GA (US); Rohit Moghe, Atlanta, GA (US); Franklin C. Lambert, Palmetto, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 276 days.

(21) Appl. No.: 13/813,635

(22) PCT Filed: Jul. 27, 2011

(86) PCT No.: PCT/US2011/045563
§ 371 (c)(1),
(2), (4) Date: Jan. 31, 2013

(87) PCT Pub. No.: WO2012/015942
PCT Pub. Date: Feb. 2, 2012

(65) Prior Publication Data
US 2013/0170264 A1    Jul. 4, 2013

Related U.S. Application Data

(60) Provisional application No. 61/368,006, filed on Jul. 27, 2010.

(51) Int. Cl.
H02M 7/21     (2006.01)
H02M 7/12     (2006.01)
H02J 5/00     (2006.01)
H02M 7/217    (2006.01)

(52) U.S. Cl.
CPC ............ *H02M 7/12* (2013.01); *H02J 5/005* (2013.01); *H02M 7/217* (2013.01)
USPC .................. 363/89; 363/127; 323/355

(58) Field of Classification Search
USPC ............ 363/44, 52, 81, 84, 89, 90, 125, 126, 363/127
See application file for complete search history.

(56) References Cited

U.S. PATENT DOCUMENTS

| | | | | |
|---|---|---|---|---|
| 3,638,074 A | * | 1/1972 | Inouye | 361/204 |
| 4,611,152 A | * | 9/1986 | Hishiki et al. | 315/411 |
| 5,019,719 A | * | 5/1991 | King | 327/110 |
| 5,220,495 A | * | 6/1993 | Zulaski | 363/84 |
| 5,274,543 A | * | 12/1993 | Loftus, Jr. | 363/127 |

(Continued)

*Primary Examiner* — Gary L Laxton
(74) *Attorney, Agent, or Firm* — Troutman Sanders LLP; Ryan A. Schneider; Dustin B. Weeks

(57) ABSTRACT

The present invention describes systems and methods for harvesting energy from an alternating magnetic field. An exemplary embodiment can include a flux concentrator having an open core coil wherein a first current with a first voltage is induced in the flux concentrator when placed proximate an alternating magnetic field. Additionally, the system can include a transformer, having a first and second winding, connected to the flux concentrator and inducing a second current in the second winding, wherein the second current has a second voltage higher than the first voltage and a threshold voltage of a first and second diode. Furthermore, the system can include a converter, connected to the secondary winding for charging the leakage inductance of the secondary winding by creating a short circuit between the secondary winding and the converter; and the diodes connected to the secondary winding and the converter for discharging the leakage inductance.

17 Claims, 8 Drawing Sheets

(56) References Cited

U.S. PATENT DOCUMENTS

| | | | |
|---|---|---|---|
| 5,329,220 A * | 7/1994 | Hase | 320/165 |
| 5,331,271 A * | 7/1994 | Thuis | 323/355 |
| 7,209,374 B2 * | 4/2007 | Noro | 363/89 |
| 7,957,163 B2 * | 6/2011 | Hua et al. | 363/21.14 |
| 2006/0279972 A1 * | 12/2006 | Shao et al. | 363/127 |
| 2007/0201253 A1 * | 8/2007 | Endo et al. | 363/127 |

* cited by examiner

Fig. 4

| Mode | Switch Status | Primary Side | Secondary Side |
|---|---|---|---|
| Mode 1: $0<\omega t<\pi$ | D = 1 (SW1 and SW2 both are ON) | Current comes out of the dot of the flux concentrator and goes into the dot of the step-up transformer | Current comes out of the dot and flows through SW1 and SW2. This leads to short circuit of the transformer secondary and hence charging of the transformer leakage inductance. |
| | D = 0 (SW1 and SW2 both are OFF) | Same as above | Current comes out of the dot and flows through D1, output load and the body diode of SW2. This leads to transfer of energy stored in the leakage inductance to the load. |
| Mode 2: $\pi<\omega t<2\pi$ | D = 1 (SW1 and SW2 both are ON) | Current goes into the dot of the flux concentrator and comes out of the dot of the step-up transformer | Current goes into the dot and flows through SW2 and SW1. This leads to short circuit of the transformer secondary and hence charging of the transformer leakage inductance. |
| | D = 0 (SW1 and SW2 both are OFF) | Same as above | Current goes into the dot and flows through D2, output load and the body diode of SW1. This leads to transfer of energy stored in the leakage inductance to the load. |

| AC Voltage (RMS Volts) | Duty Cycle (%) | DC Voltage (Volts) |
|---|---|---|
| 0.125 | 0 | 2.25 |
| 0.125 | 10 | 2.5 |
| 0.125 | 30 | 3 |
| 0.125 | 50 | 3.5 |
| 0.125 | 70 | 4.4 |

Fig. 7

SYSTEMS AND METHODS FOR PROVIDING AC/DC BOOST CONVERTERS FOR ENERGY HARVESTING

CROSS REFERENCE TO RELATED APPLICATION

This application claims the benefit of U.S. Provisional Patent Application No. 61/368,006 filed 27 Jul. 2010, the entire contents and substance of which are hereby incorporated by reference as if fully set forth below.

FIELD OF THE INVENTION

The present invention relates generally to energy harvesters and specifically to energy harvesters for magnetic field energy.

BACKGROUND

Advancements in microelectronics and wireless communication technologies have led to the development of low cost ultra low power wireless sensors. Sensing information in large networks, i.e. power grid monitoring, large-scale home automation, etc., requires a network of low power sensors connected in a meshed topology and communicating through a wireless hopping scheme. Such a wireless sensor network consists of thousands of sensors simultaneously monitoring, transmitting, and receiving information. Although the sensors consume very little power, serving their energy needs through batteries leads to unmanageable maintenance requirements.

A typical sensor node current requirement during transmission/reception is 25-50 mA, while during the sleep mode the requirement reduces to only around 10 s of µA. Particular implementations can vary widely, but the power requirements of a simple scenario can help to illustrate the problem of maintaining power to these devices. A sample device may have a transmission/reception load requirement of 35 mA to cover a typical distance of 200 m, and a sleep requirement of 75 µA. A typical operation time for such a sensor node can be three seconds, and the sensor node can be required to transmit or receive data on average every 15 minutes. For a 9V battery with a 1200 mAh capacity, the battery would last no more that approximately 260 days. Moreover, as the distance of transmission and reception increases, the life of the battery decreases. The cost, time, and manpower involved in identifying and locating failing nodes then changing batteries for thousands of sensor nodes every few months would be prohibitive. This would discourage utilities from implementing such a technology.

Harvesting stray electromagnetic energy is a promising solution that can make wireless sensor nodes a viable technology. Since many utility assets carry current, they naturally have magnetic fields near them. The energy in the magnetic fields of these assets can be a prospective source for powering such low power sensors; however, the technology presents a number of challenges that must be overcome before the technique is practical. The energy present in the magnetic field around the utility asset fluctuates, as it is dependent on the current flowing in the asset. When the current in the asset is very small, the energy in the magnetic field is insufficient to operate the sensor. High currents, during lightning strikes or faults, may cause excessive voltage buildup on the harvester and destroy the supporting sensor electronics.

The voltage levels produced from most methods of harvesting energy are often too small to power any supporting electronic circuits. Rectification, the process of converting the harvested energy from alternating current to the direct current used in most conventional electronics, reduces the voltage level of the harvested energy by a certain amount. This amount is the threshold voltage level of the diodes used in the rectification process, and many energy harvesting methods do not result in voltage levels high enough to surpass the threshold voltage.

FIG. 1 is an illustration of a conventional power circuit 100 for energy harvesting applications. An energy harvester 110 produces an alternating current. A diode bridge rectifier 120 converts the alternating current to direct current. A gating pulse generator 150 produces a pulse that alternately opens and closes a switch 140 connecting the inductor 130 to the diode bridge rectifier 120. When the switch 140 is closed, energy builds in the magnetic field surrounded the inductor 130. When the switch 140 opens, the stored energy in the inductor 130 is released, boosting the voltage across the output. The current then flows through a diode 160 to the resistive load 180. Energy harvesters that draw energy from a magnetic field typically do not produce energy with a voltage level high enough to surpass the threshold level of the diode bridge rectifier 120 while still retaining enough voltage to operate the microcontrollers, transceivers, and other components that make up the load 180 of a wireless sensor.

Some conventional solutions can harvest enough magnetic energy to surpass the threshold level by using energy harvesters that clamp around power lines, forming a closed magnetic loop. However, the size and expense of these solutions render them non-feasible for commercial usage in networks requiring thousands of units.

Thus, there is a need for a solution that can harvest energy from a magnetic field, convert the energy from alternating current to direct current and still provide enough power to operate the supporting electronic circuitry of the wireless sensor.

BRIEF SUMMARY OF THE INVENTION

The present invention describes systems and methods for harvesting energy from an alternating magnetic field. An exemplary embodiment of the present invention provides a circuit for harvesting energy from an alternating magnetic field including a flux concentrator having an open core coil wherein a first current with a first voltage can be induced in the flux concentrator when placed proximate an alternating magnetic field. Additionally, the system includes a transformer, having a first winding and a second winding, connected to the flux concentrator and inducing a second current in the second winding, wherein the second current has a second voltage higher than the first voltage and a threshold voltage of a first diode and a second diode. Furthermore, the system includes a converter, connected to the secondary winding for charging the leakage inductance of the secondary winding by creating a short circuit between the secondary winding and the converter; and the first diode and the second diode connected to the secondary winding and the converter for discharging the leakage inductance.

An exemplary embodiment of the present invention also provides a method for harvesting energy from an alternating magnetic field including inducing a first current having a first voltage from the alternating magnetic field; inducing a second current having a second voltage with a transformer having a first and second winding, wherein the second voltage is higher than the first voltage and a diode threshold voltage of an output diode; charging a leakage inductance in the secondary winding by creating a connection between an output of the secondary winding and an input of the secondary winding;

and discharging the leakage inductance in the secondary winding by disconnecting the connection between the output of the secondary winding and the input of the secondary winding.

An exemplary embodiment of the present invention also provides a system for harvesting energy from an alternating magnetic field comprising a current-carrying asset; a first alternating current flowing through the current-carrying asset and creating the alternating magnetic field; an open core coil proximate to the current-carrying asset wherein a second alternating current with a first voltage is induced in the open core coil from the alternating magnetic field; and a transformer for inducing a third alternating current with a second voltage. Additionally, the system includes a converter connected to the transformer for selectively connecting an output terminal of the transformer with an input terminal of the transformer; a first output diode and a second output diode connected to the converter and the transformer; an astable multivibrator producing a clock signal and connected to the converter and the first and second output diode; and a sensing circuit for taking measurements and transmitting the measurements wirelessly; wherein the second voltage is higher than a threshold voltage of the first diode and the second diode.

These and other objects, features and advantages of the present invention will become more apparent upon reading the following specification in conjunction with the accompanying drawing figures.

BRIEF DESCRIPTION OF THE FIGURES

FIG. 4 is a table containing a summary of the operation of an exemplary embodiment of the present invention.

FIG. 7 presents the results of a system for harvesting energy from an alternating magnetic field in accordance with an exemplary embodiment of the present invention operating at different duty cycles with a primary alternating current of 50 A, a load resistance of 50 kΩ, and an oscillating frequency of 2 kHz.

DETAILED DESCRIPTION

Figure 1:
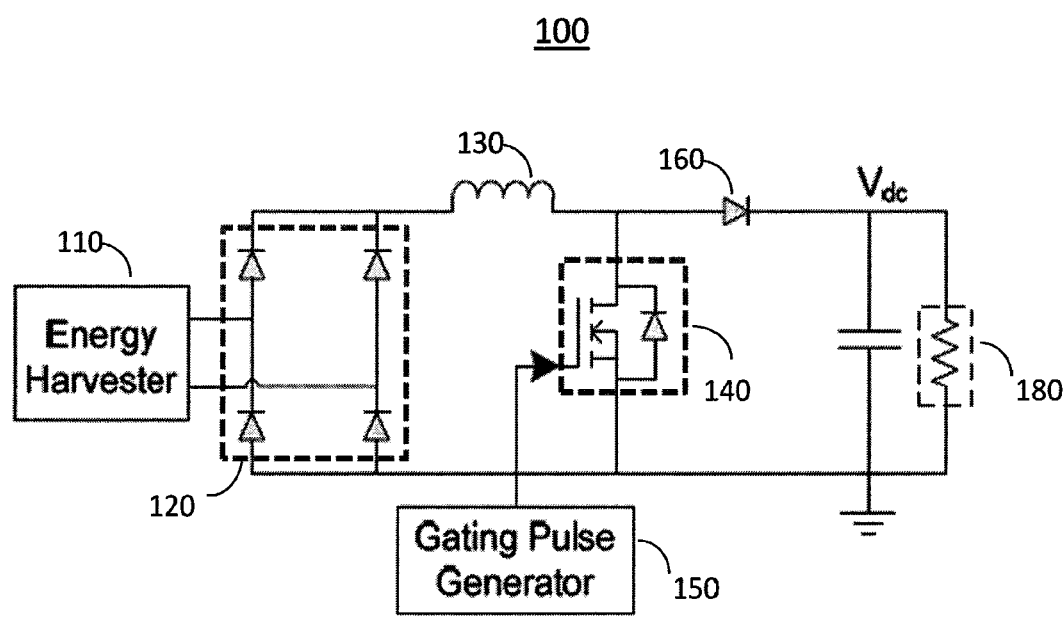
FIG. 1 is an illustration of a conventional power circuit for energy harvesting applications.

To facilitate an understanding of the principles and features of the present invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples.

The elements described hereinafter as making up the invention are intended to be illustrative and not restrictive. Many suitable elements that would perform the same or similar functions as the elements described herein are intended to be embraced within the spirit and scope of the invention. Such other materials and components that are embraced but not described herein can include, without limitation, similar or analogous materials or components developed after development of the invention.

An exemplary embodiment of the present invention provides a circuit for harvesting energy from an alternating magnetic field including a flux concentrator having an open core coil wherein a first current with a first voltage can be induced in the flux concentrator when placed proximate an alternating magnetic field. Additionally, the system includes a transformer, having a first winding and a second winding, connected to the flux concentrator and inducing a second current in the second winding, wherein the second current has a second voltage higher than the first voltage and a threshold voltage of a first diode and a second diode. Furthermore, the system includes a converter, connected to the secondary winding for charging the leakage inductance of the secondary winding by creating a short circuit between the secondary winding and the converter; and the first diode and the second diode connected to the secondary winding and the converter for discharging the leakage inductance.

An exemplary embodiment of the present invention also provides a method for harvesting energy from an alternating magnetic field including inducing a first current having a first voltage from the alternating magnetic field; inducing a second current having a second voltage with a transformer having a first and second winding, wherein the second voltage is higher than the first voltage and a diode threshold voltage of an output diode; charging a leakage inductance in the secondary winding by creating a connection between an output of the secondary winding and an input of the secondary winding; and discharging the leakage inductance in the secondary winding by disconnecting the connection between the output of the secondary winding and the input of the secondary winding.

An exemplary embodiment of the present invention also provides a system for harvesting energy from an alternating magnetic field comprising a current-carrying asset; a first alternating current flowing through the current-carrying asset and creating the alternating magnetic field; an open core coil proximate to the current-carrying asset wherein a second alternating current with a first voltage is induced in the open core coil from the alternating magnetic field; and a transformer for inducing a third alternating current with a second voltage. Additionally, the system includes a converter connected to the transformer for selectively connecting an output terminal of the transformer with an input terminal of the transformer; a first output diode and a second output diode connected to the converter and the transformer; an astable multivibrator producing a clock signal and connected to the converter and the first and second output diode; and a sensing circuit for taking measurements and transmitting the measurements wirelessly; wherein the second voltage is higher than a threshold voltage of the first diode and the second diode.

Referring now to the figures, in which like reference numerals represent like parts throughout the views, various embodiments of the present invention will be described in detail.

Figure 2:
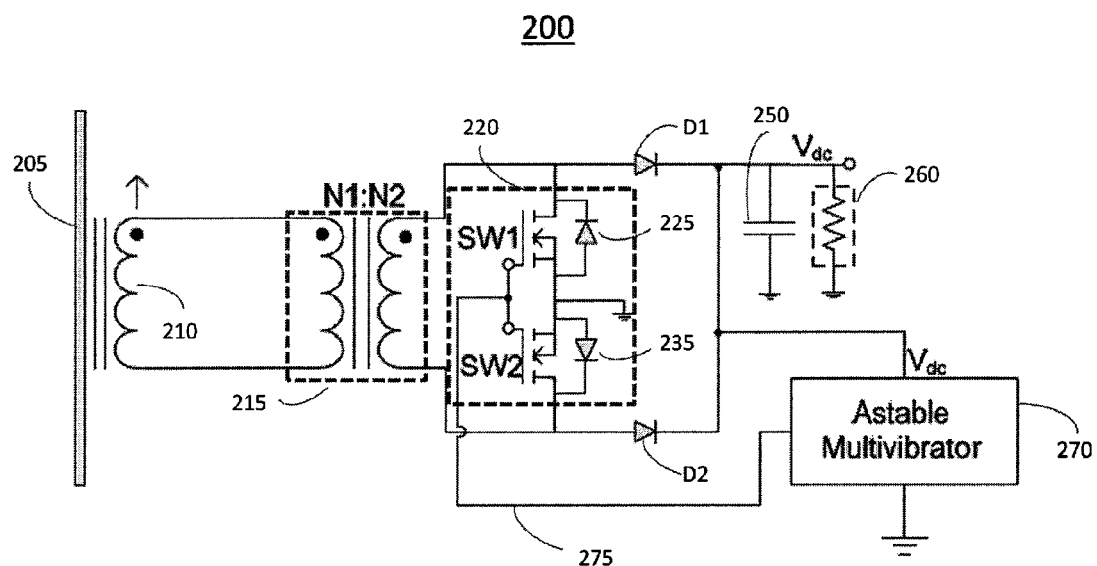
FIG. 2 illustrates a block diagram of a system for harvesting energy from an alternating magnetic field in accordance with an exemplary embodiment of the present invention.

FIG. 2 illustrates a block diagram of a system for harvesting energy from an alternating magnetic field 200 in accordance with an exemplary embodiment of the present invention. In an exemplary embodiment of the present invention, a current-carrying asset 205, such as an electrical transmission line at a power substation, can carry an alternating current. In an exemplary embodiment of the present invention, the alternating current can produce an alternating magnetic field that emanates from the current-carrying asset 205. In an exemplary embodiment of a system for harvesting energy from an alternating magnetic field 200, an alternating current can be induced in a nearby flux concentrator 210 from the alternating magnetic field that exists in the vicinity of the current-carrying asset 205. The flux concentrator can be an open core coil.

In an exemplary embodiment of the present invention, the flux concentrator 210 can be connected to a transformer 215 such that the current flowing from the flux concentrator 210 through the primary winding N1 of the transformer 215 can induce a current through the secondary winding N2. In an exemplary embodiment of the present invention, the secondary winding N2 of the transformer 215 can be connected to a pair of diodes D1 and D2 and a converter 220. In an exemplary embodiment, the converter 220 can have two MOSFET switches SW1 and SW2 arranged in an AC switch structure (common source). In an exemplary embodiment of the present invention, each of the two switches SW1 and SW2 can be connected in parallel with a diode 225 and 235 respectively.

In an exemplary embodiment of the present invention, the converter 220 can respond to an applied clock signal 275. In an exemplary embodiment, when the clock signal 275 applied to the gates of SW1 and SW2 goes high, current can flow through the switches SW1 and SW2 of the converter 200, making a short circuit between the converter 200 and the secondary winding N2. In an exemplary embodiment, the short circuit between the converter 220 and the secondary winding N2 can charge the leakage inductance in the secondary winding N2. In an exemplary embodiment of the present invention, when the clock signal 275 goes low, the electrical path through the switches SW1 and SW2 of the converter 220 can be disconnected, breaking the circuit between the secondary winding N2 and the converter 220 and causing the leakage inductance to be discharged through one of the diodes D1 or D2. During the charging phase in an exemplary embodiment of the present invention, some of the electrical energy of the current flowing through the secondary winding can be stored in the magnetic field as leakage inductance. In an exemplary embodiment of the present invention, when the leakage inductance is discharged, this energy can boost the voltage level of the current flowing through the secondary winding. The boosted voltage can be high enough to exceed the threshold voltage of D1 and D2.

In an exemplary embodiment of the present invention, an oscillator 270 can be connected to the converter 220 and the output of the diodes D1 and D2. In an exemplary embodiment of the present invention, the oscillator produces a clock signal 275 that alternates between high and low values at a regular rate. In an exemplary embodiment of the present invention, the clock signal 275 can oscillate with a frequency in the kHz range. Those of skill in the art will appreciate that the clock signal can also oscillate at a variety of different frequencies including hundreds of Hertz, MHz, GHz and others. In an exemplary embodiment of the present invention, the oscillator 270 can emit the clock signal 275 that controls the charging and discharging of the leakage inductance in the secondary winding N2.

In an exemplary embodiment of the present invention, a load 260 representing a wireless sensor or other device can also be connected to and receive power from the output of the diodes D1 and D2. In an exemplary embodiment of the present invention, the output received from D1 and D2 is generally a boosted power source.

In an exemplary embodiment of the present invention, the flux concentrator 210 can be an open core coil. Unlike closed core structures that form a closed path around a current-carrying asset through which the magnetic flux is contained, open core structures harness less of the magnetic field because of the high level of fringing. In an exemplary embodiment of the present invention, the flux concentrator 210 can be a ferromagnetic core surrounded by a conductive wire coil. In an exemplary embodiment of the present invention, the core can be configured as a double-ended shape where the cross-sectional area of each end is greater than the cross-sectional area of the midsection of the core. In an exemplary embodiment of the present invention, the ferromagnetic core material can have a higher magnetic permeability than the environment surrounding the flux concentrator causing any magnetic flux lines that contact the ends of the core to be channeled through the body of the core and out of the opposite end. Because the cross-sectional areas at the ends of the core can be greater than the cross-sectional area of the midsection, the flux lines entering and exiting at the ends are concentrated in the midsection of the core. In an exemplary embodiment of the present invention, as the intensity of the alternating magnetic field passing through the core rises and falls, an alternating current is induced in the conductive wire coil that can surround the core. In an exemplary embodiment, an alternating current of as little as 50 A passing through the current-carrying asset can induce a current in the flux concentrator having an open circuit voltage of 125 mV.

In an exemplary embodiment of the present invention, the alternating current induced in the flux concentrator can flow through the primary winding N1 of the transformer 215. The transformer 215 can be configured to have a higher number of wire turns in the secondary winding N2 than in the primary winding N1, which results in the current through the secondary winding N2 having a higher voltage across the windings than the current through the first winding N1. In an exemplary embodiment, a current having an open circuit voltage of 125 mV in the primary winding N1 can induce a current in the secondary winding N2 having a voltage across the windings high enough to overcome the threshold voltage of typical semiconductor diodes, which is typically in the 0.2 V to 0.7 V range. In a system for harvesting energy from an alternating magnetic field 200 in accordance with an exemplary embodiment of the present invention, the voltage boost that can be provided by the transformer 215 can allow the system 200 to bootstrap itself into operation at relatively low input currents.

The MOSFET switches SW1 and SW2 that can make up the converter 220 in an exemplary embodiment of a system for harvesting energy from an alternating magnetic field 200 can be arranged in an AC switch structure (common source). The switches SW1 and SW2 can be connected to the diodes D1 and D2 in an exemplary embodiment of the present invention. In an exemplary embodiment of the present invention, this arrangement can enable the rectification of the current induced in the secondary winding N2. In an exemplary embodiment of the present invention, the current induced in the secondary winding N2 can flow through D1 during one phase of the current and through D2 during the other phase when the polarity of the current reverses.

In an exemplary embodiment of the present invention, the clock signal 275 from the oscillator 270 can be connected to the gates of both switches SW1 and SW2. The switches SW1 and SW2 can act in unison with the clock signal 275 applied to their gates so that each will be closed when the clock signal 275 goes high and each will be open when the clock signal 275 goes low. In an exemplary embodiment of the present invention, the oscillator 270 producing the clock signal can be an astable multivibrator 270. The transformer 215 in an exemplary embodiment of the present invention can boost the voltage across the secondary winding N2 high enough to exceed the threshold voltage of D1 and D2 and allow the current to flow. The oscillator 270, in an exemplary embodiment of the present invention, can provide an additional boost to the voltage of the current that can build the voltage to a level high enough to meet the requirements of the electronics of the load 280.

Figure 3:
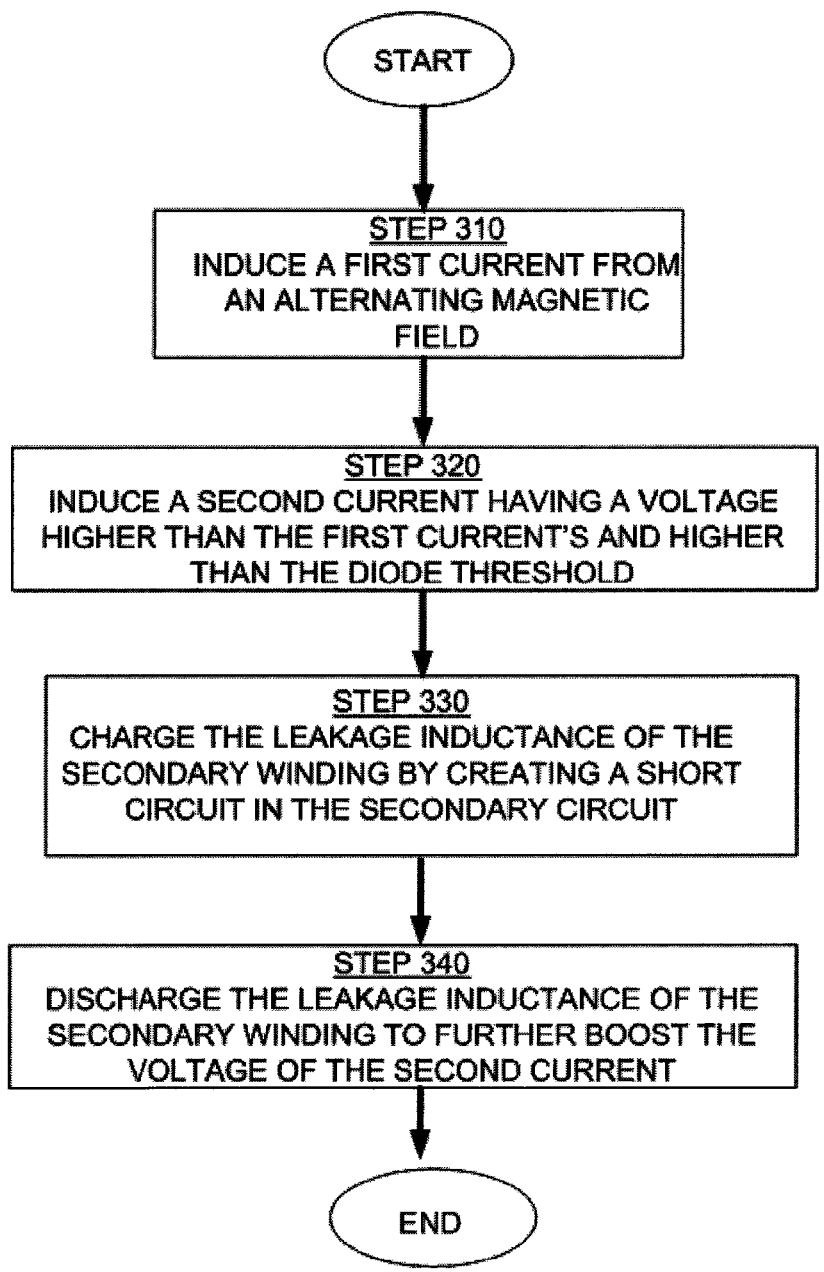
FIG. 3 is an illustration of a method of harvesting energy from an alternating magnetic field in accordance with an exemplary embodiment of the present invention.

FIG. 3 is an illustration of a method of harvesting energy from an alternating magnetic field in accordance with an exemplary embodiment of the present invention. The first step 310 of an exemplary embodiment of the present invention can involve inducing a first current in a flux concentrator 210 from an alternating magnetic field. In an exemplary embodiment, the first step 310 can be accomplished by placing the system for harvesting energy from an alternating magnetic field 200 near a current-carrying asset 205 such as a power line. The next step 320 of an exemplary embodiment of the present invention can involve inducing a second current having a voltage that is higher than the voltage of the first current and the threshold voltage of D1 and D2. In an exemplary embodiment, the higher voltage may be achieved using a transformer 215.

Although in an exemplary embodiment of the present invention, a transformer 215 can step up the induced voltage high enough to overcome the voltage threshold for diodes, a higher voltage level may be needed to power a wireless sensor or other device that may be attached to the present invention. Microcontrollers, signal conditioning circuits and other supporting circuitry that might be present in a device powered by the present invention can require voltages in an operating range of 2.7 V to 5 V. The extra voltage needed to power these devices can be provided by the interplay between the clock signal 275, the converter 220, the secondary winding N2 and the frequency of the alternating current travelling through the current-carrying asset 205 in an exemplary embodiment of the present invention.

Step 330, in an exemplary embodiment of the present invention, can involve charging the leakage inductance of the secondary winding N2 of the transformer 215 by creating a short circuit in the circuit of the secondary winding N2.

Power lines typically carry currents that alternate at frequencies of about 50 Hz or 60 Hz, although other frequencies are possible. In an exemplary embodiment of the present invention, the currents induced in the flux concentrator 210 and in the secondary winding N2 of the transformer 215 can have the same frequency as the alternating current travelling through the power line or other current-carrying asset 205. FIG. 4 is a table containing a summary of the operation of an exemplary embodiment of the present invention. In an exemplary embodiment of the present invention, the oscillator 270 can produce a clock signal 275 having a frequency in the kHz range, although those of skill in the art will understand that various other frequencies can be used for the clock signal. In an exemplary embodiment of the present invention, for each cycle of the alternating current in the current-carrying asset 205, the clock signal 275 can alternate on an off hundreds of times. In an exemplary embodiment of the present invention, diodes D1 and D2 rectify the alternating current induced in the secondary winding N2 by allowing the current to flow through one of D1 or D2 for the half-cycle when the phase of the alternating current in N2 is between 0 and $\pi$, and through the other of D1 or D2 for the half-cycle when the phase is between $\pi$ and $2\pi$. The operation of an exemplary embodiment of the present invention while the phase of the alternating current in N2 is between 0 and $\pi$ will now be described. In an exemplary embodiment of the present invention, the clock signal 275 can apply a high value to the gates of SW1 and SW2, during the clock signal's on phase, that can cause the switches to close, creating a short circuit between the converter 215 and the secondary winding of the transformer. In an exemplary embodiment of the present invention, the short circuit can charge a leakage inductance in the secondary winding N2 of the transformer 215. During the clock signal's off phase, in an exemplary embodiment of the present invention, the clock signal 275 applied to the gates of SW1 and SW2 can go low, causing the switches SW1 and SW2 to open and disconnect the electrical path between the converter 220 and the secondary winding N2 of the transformer 215. Once the path is disconnected, the leakage inductance in the secondary winding N2 can discharge in Step 340. In an exemplary embodiment, the energy of the discharging leakage inductance can further increase the voltage of the current flowing through the secondary winding N2. With the path through the converter 220 now broken, the current can now flow through the first diode D1 and on to the load 260.

The scenario when the phase of the alternating current in the current-carrying asset 205 is between pi and $2\pi$ is similar to the previous scenario in an exemplary embodiment of the present invention. During the clock signal's on phase, the clock signal 275 applied to the gates of SW1 and SW2 can cause the switches to close, creating a short circuit between the converter 220 and the secondary winding N2 of the transformer 215. The short circuit can charge a leakage inductance in the secondary winding N2 of the transformer 215. During the clock signal's off phase, in an exemplary embodiment of the present invention, the clock signal 275 applied to the gates of SW1 and SW2 can go low, causing the switches SW1 and SW2 to open and breaking the circuit between the converter 220 and the secondary winding N2 of the transformer 215. Once the circuit is broken, the leakage inductance in the secondary winding N2 can discharge in Step 340. Because the polarity of the alternating current in the current-carrying asset 205 is now reversed, the current through the secondary winding N2 with the further increased voltage can flow through the second diode D2 and on to the load.

Figure 5:
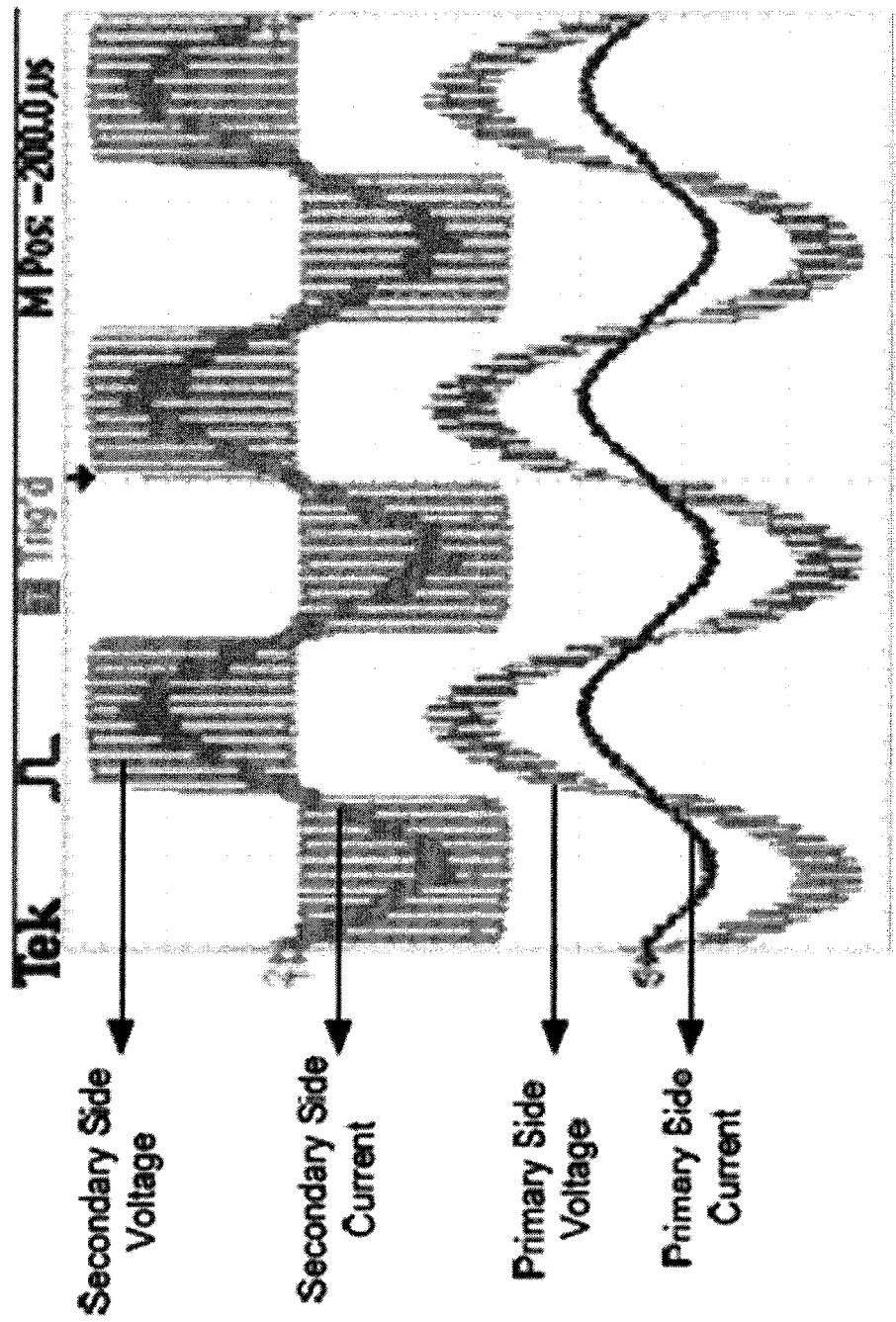
FIG. 5 is an illustration of the current and voltage waveforms at the primary and secondary sides of the transformer in an exemplary embodiment of the present invention.

FIG. 5 is an illustration of the current and voltage waveforms at the primary and secondary sides of the transformer 215 in an exemplary embodiment of the present invention. In FIG. 5, it can be seen how the voltage levels across the secondary side rise and fall multiple times for each half-phase of the alternating current through the current-carrying asset 205 in an exemplary embodiment of the present invention. The rising and falling voltage levels can correspond to the charging and discharging of the leakage inductance in an exemplary embodiment of the present invention. It can also be seen how, in an exemplary embodiment of the present invention, when the alternating current through the current-carrying asset 205 changes polarity, the multiple cycles of the voltage waveform can also change polarity.

Figure 6:
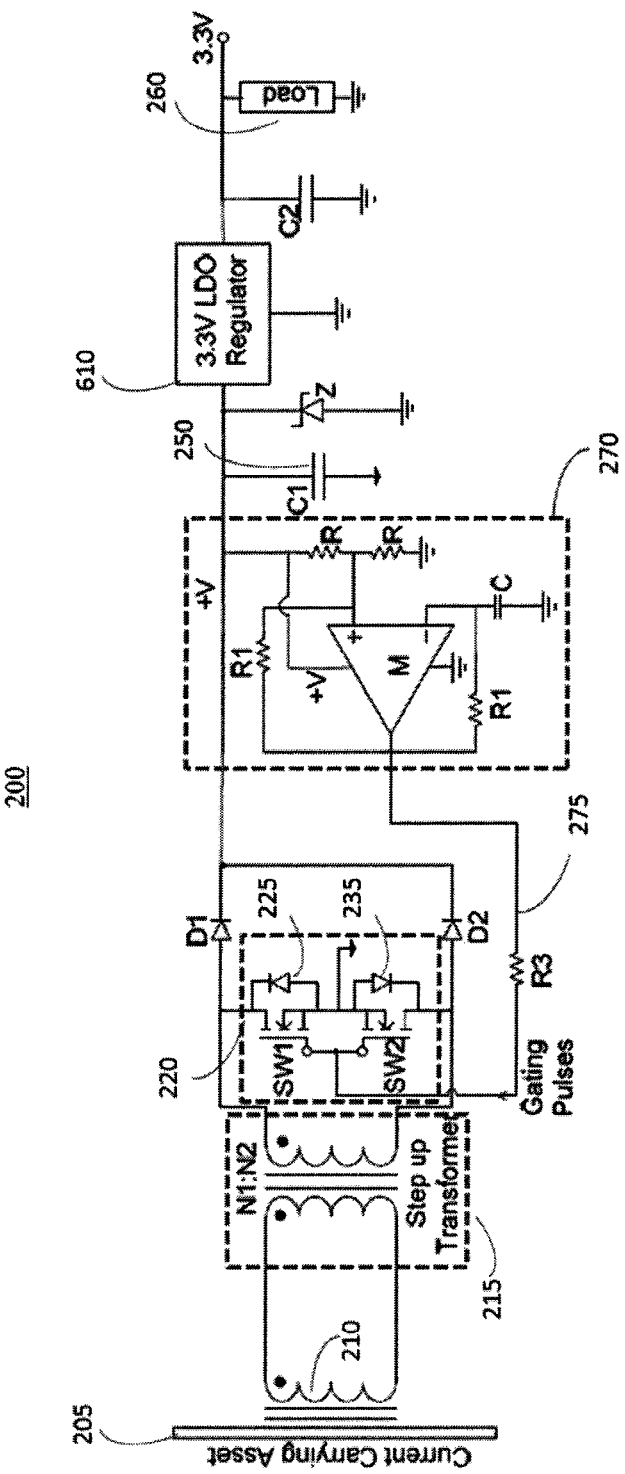
FIG. 6 illustrates a block diagram of a system for harvesting energy from an alternating magnetic field in accordance with an exemplary embodiment of the present invention.

FIG. 6 illustrates a block diagram of a system for harvesting energy from an alternating magnetic field in accordance with an exemplary embodiment of the present invention. An exemplary embodiment of the present invention can have a low drop off (LDO) voltage regulator 610 to ensure a constant voltage level to the load 260.

In an exemplary embodiment of the present invention, the system for harvesting energy from an alternating magnetic field can be powered autonomously when the alternating current through the current-carrying asset 205 is as low as 50 A. FIG. 7 presents the results of a system for harvesting energy from an alternating magnetic field in accordance with an exemplary embodiment of the present invention operating at different duty cycles with a primary alternating current of 50 A, a load resistance of 50 kΩ, and an oscillating frequency of 2 kHz.

Figure 8:
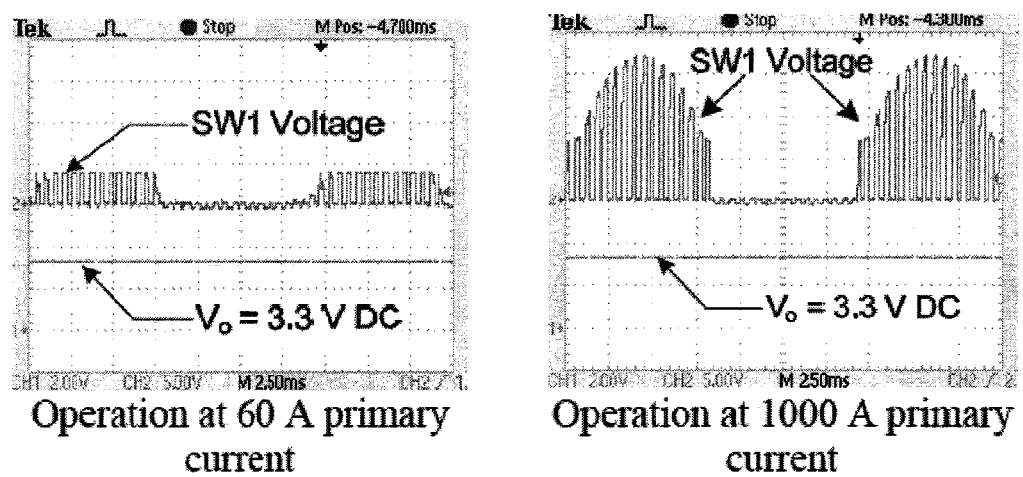
FIG. 8 illustrates the voltage across a switch for different amplitude values of an alternating current flowing through a current-carrying asset in an exemplary embodiment of the present invention.

FIG. 8 illustrates the voltage across switch SW1 for different amplitude values of the alternating current flowing through the current-carrying asset 205 in an exemplary embodiment of the present invention.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A system for harvesting energy from an alternating magnetic field comprising:
    a flux concentrator having an open core coil wherein a first current with a first voltage can be induced in the flux concentrator when placed proximate an alternating magnetic field;
    a transformer, having a first winding and a second winding, connected to the flux concentrator and enabled to induce a second current in the second winding, wherein the second current has a second voltage higher than the first voltage and higher than a threshold voltage of a first diode and a second diode;
    a converter configured to selectively connect a short circuit between the secondary winding and the converter to charge the leakage inductance of the secondary winding; and
    the first diode and the second diode connected to the secondary winding and the converter for discharging the leakage inductance.

2. The system of claim 1, wherein the flux concentrator further comprises:
    a ferromagnetic core having a midsection and at least two ends, wherein a cross-sectional area of the at least two ends is greater than a cross-sectional area of the midsection;
    a conductive wire coil surrounding the ferromagnetic core.

3. The system of claim 1 further comprising an oscillator connected to the converter and the first diode and second diode for controlling the charging and discharging of the leakage inductance.

4. The system of claim 3, wherein the oscillator is powered solely from the leakage inductance.

5. The circuit of claim 3, wherein the converter further comprises:
    a first MOSFET switch with a first body diode connected in parallel and a first gate,
    a second MOSFET switch with a second body diode connected in parallel and a second gate; and
    wherein the first MOSFET switch and the second MOSFET switch are arranged in common-source configuration.

6. The system of claim 5, wherein the oscillator is connected to the first gate and the second gate.

7. The system of claim 6, wherein controlling the charging and discharging of the leakage inductance is accomplished with a clock signal emitted by the oscillator, wherein an on phase of the clock signal closes the first gate and the second gate and an off phase of the clock signal opens the first gate and the second gate.

8. The system of claim 7, wherein controlling the charging and discharging of the leakage inductance further comprises sending the clock signal to the first gate and the second gate;
    wherein during the on phase of the clock signal, a short circuit is formed between the converter and the secondary winding that charges the leakage inductance; and
    wherein during the off phase of the clock signal, the leakage inductance is discharged through one of the first diode and the second diode.

9. A method for harvesting energy from an alternating magnetic field comprising:
    placing a system for harvesting energy having a transformer proximate the alternating magnetic field;
    inducing, from the alternating magnetic field, a first current having a first voltage on the transformer;
    inducing a second current having a second voltage with the transformer having a first and second winding, wherein the second voltage is higher than the first voltage and a diode threshold voltage of an output diode;
    charging a leakage inductance in the secondary winding by creating a connection between an output of the secondary winding and an input of the secondary winding; and
    discharging the leakage inductance in the secondary winding by disconnecting the connection between the output of the secondary winding and the input of the secondary winding.

10. The method of harvesting energy of claim 9, wherein the leakage inductance in the secondary winding is charged and discharged in response to each cycle of an oscillating signal.

11. The method of harvesting energy of claim 10, wherein the oscillating signal has an oscillating frequency several times higher than an alternating frequency of the alternating magnetic field.

12. A system for harvesting energy from an alternating magnetic field comprising:
    a current-carrying asset;
    a first alternating current flowing through the current-carrying asset and creating the alternating magnetic field;
    an open core coil proximate to the current-carrying asset wherein a second alternating current with a first voltage is induced in the open core coil from the alternating magnetic field;
    a transformer for inducing a third alternating current with a second voltage;
    a converter connected to the transformer for selectively connecting an output terminal of the transformer with an input terminal of the transformer;
    a first output diode and a second output diode connected to the converter and the transformer;
    an astable multivibrator producing a clock signal and connected to the converter and the first and second output diode; and
    a sensing circuit for taking measurements and transmitting the measurements wirelessly;
    wherein the second voltage is higher than a threshold voltage of the first diode and the second diode.

13. The system of claim 12, wherein the current-carrying asset is an electrical transmission line.

14. The system of claim 12, wherein the first alternating current alternates with a frequency in a range between about 50 Hz and about 60 Hz.

15. The system of claim 12, wherein the converter charges a leakage inductance in the transformer when a connection is established between the output terminal and input terminal of the transformer.

16. The system of claim 15, wherein the leakage inductance is discharged when the connection is disconnected.

17. The system of claim 16, wherein the connection is established and the connection is disconnected in response to a high value and a low value of the clock signal respectively.

* * * * *